US009256681B2

(12) United States Patent
Kenefic et al.

(10) Patent No.: US 9,256,681 B2
(45) Date of Patent: Feb. 9, 2016

(54) METHOD AND SYSTEM FOR IDENTIFYING CLUSTERS WITHIN A COLLECTION OF DATA ENTITIES

(71) Applicant: Raytheon Company, Waltham, MA (US)

(72) Inventors: Richard J. Kenefic, Fort Wayne, IN (US); John G. Watts, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/686,995

(22) Filed: Nov. 28, 2012

(65) Prior Publication Data

US 2014/0149410 A1    May 29, 2014

(51) Int. Cl.
*G06F 17/30* (2006.01)

(52) U.S. Cl.
CPC .... *G06F 17/30864* (2013.01); *G06F 17/30705* (2013.01); *G06F 17/30867* (2013.01)

(58) Field of Classification Search
CPC . G06F 17/50; G06F 17/5009; G06F 17/5018; G06F 17/211; G06F 17/30011; G06F 17/30442; G06F 17/30598; G06F 17/30657; G06F 17/30241; G06F 17/30333; G06F 17/3002; G06F 17/30548; G06F 17/30864; G06F 17/18; G06F 17/10; G06F 17/27; G06F 17/274; G06F 17/28; G06F 17/30985; G06F 17/30424; G06F 17/30592; G06F 17/30259; G06F 17/5072; G06F 9/50; G06F 17/24; G06F 17/30634; G06F 17/5081; G06F 17/30601; G06F 17/30539; G06F 17/30684; G06F 17/30687; G06F 17/30973
USPC .................................................. 707/723, 737
See application file for complete search history.

(56) References Cited

U.S. PATENT DOCUMENTS

| | | | |
|---|---|---|---|
| 6,542,171 B1* | 4/2003 | Satou et al. ................... 715/833 |
| 6,812,925 B1* | 11/2004 | Krishnan et al. ............. 345/423 |
| 8,280,698 B2* | 10/2012 | Montana et al. .................. 703/1 |
| 2002/0026289 A1* | 2/2002 | Kuzunuki et al. ............. 702/150 |
| 2007/0038369 A1* | 2/2007 | Devries ......................... 701/208 |
| 2010/0114485 A1* | 5/2010 | Bhogal et al. ................. 701/210 |
| 2010/0161602 A1* | 6/2010 | Caceres ........................ 707/736 |
| 2011/0040750 A1* | 2/2011 | Safra et al. .................... 707/723 |
| 2012/0278349 A1* | 11/2012 | Bidlack ......................... 707/758 |
| 2013/0275106 A1* | 10/2013 | Li et al. .......................... 703/10 |

* cited by examiner

*Primary Examiner* — Pierre Vital
*Assistant Examiner* — Andalib Lodhi
(74) *Attorney, Agent, or Firm* — Schwegman Lundberg & Woessner, P.A.

(57) ABSTRACT

Embodiments of a method and system for identifying clusters in collections of data entities are generally described herein. In some embodiments, the method includes defining a metric space over the data entities. A distance function of the metric space may satisfy the triangle inequality. The method may include determining, based on the distance function of the metric space, a value for a number of clusters that minimizes a number of data bits used to define a model of the collection of the data entities. The model may thereby describe the collection of data entities using a minimum description length (MDL). The method may include assigning data entities of the collection of data entities to the clusters. The number of clusters to which the data entities are assigned may correspond to the determined value.

16 Claims, 4 Drawing Sheets

METHOD AND SYSTEM FOR IDENTIFYING CLUSTERS WITHIN A COLLECTION OF DATA ENTITIES

GOVERNMENT RIGHTS

This invention was not made with United States Government support. The United States Government does not have certain rights in this invention.

TECHNICAL FIELD

Some embodiments relate to data track mining. Some embodiments relate to mining of geo-referenced polygonal trajectories. Some embodiments relate to finding one or more preferred geo-referenced routes.

BACKGROUND

One issue with data track mining of large databases of geo-referenced trajectories is that algorithms that cluster data tracks may require time-consuming and inefficient user interaction. For example, user interaction may be required to determine how many clusters there are within the track data, and user interaction may be required to select a preferred or "best" cluster from the clusters. Further, clustering algorithms may apply metrics that do not satisfy requirements, or axioms, of a metric space. Therefore, artifacts may appear when conventional clustering algorithms are used.

Thus, there are general needs for algorithms to determine a number of clusters in track data with little or no user input. There are also general needs to determine these clusters based on a metric space that satisfies axioms of a metric space so that artifacts may be reduced or eliminated.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
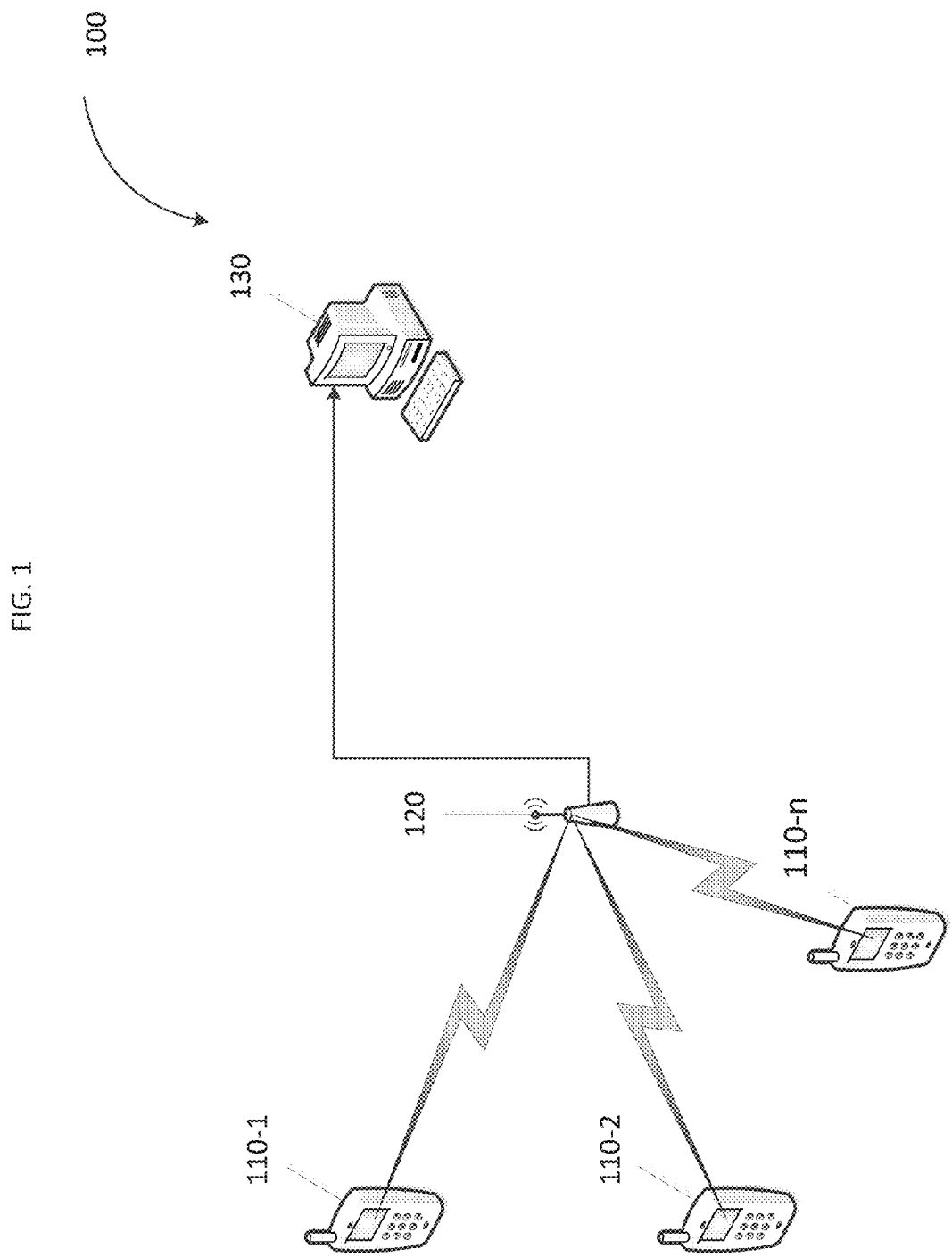
FIG. 1 is a system in accordance with some embodiments.

FIG. 1 is a network in which example embodiments may be implemented. The network comprises one or more user devices 110-1 through 110-n. The user devices 110-1 through 110-n may support location-based services. The user devices 110-1 through 110-n may support location-based services by including, for example, global-positioning system (GPS) functionality. The user devices 110-1 through 110-n may be, for example, mobile phones, smart phones, tablet computers, laptop computers, or any other devices that can communicate over a network. The user devices 110-1 through 110-n may also be sensors attached to vehicles, animals, or any other entity that can have attached thereto a sensor for providing data to, for example, a radar system (not shown).

The user devices 110-1 through 110-n may provide data through, for example, an access point 120 to a computer 130. It will be understood that the user devices 110-1 through 110-n may provide data through other means such as through a radar system (not shown), cellular base station (not shown) or other means. The computer 130 may then be used to find common sub-trajectories, or clusters, within the data.

The growing availability of GPS track data has led to many potential applications, including studies of vehicle mobility to discover patterns of road usage and support proactive car-pooling services, studies of animal movement patterns, and monitoring aircraft trajectories on approach. A common theme in studies of mobility data management and algorithms for large data sets has been the identification of trajectory clusters and outliers. Some conventional algorithms for clustering use a normalized edit distance that does not satisfy the triangle inequality. While this may result in speedy computation, it may also lead to artifacts within data.

Other algorithms for clustering require user input of the number of clusters. In other words, the user manually needs to identify the number of clusters that the user sees in the track data. Other conventional methods considered the problem of efficiently combining multi-source tracks in space and time using a variant of a Fréchet distance metric that does not satisfy the triangle inequality and without using a minimum description length (MDL). Still further conventional methods studied the performance (i.e. coverage and purity) of k-means, OPTICS, and several other clustering approaches for track data that included a time dimension in the metric, but tuned these approaches to the number of clusters present in the generated data set. Other conventional approaches to automated clustering applied to point data used algorithms that were undefined in the case of one cluster, which may be an important case to be considered when partitioning track data.

Example embodiments described herein may discover the number of track clusters without user input. Example embodiments are defined for any number of clusters up to the number of tracks in the data set. Example embodiments are further based on MDL. The MDL principle has been used for cognitive model selection, to identify image segments, common objects in different track files, and segments of a data sequence with the same variance. Example embodiments extend the use of MDL to determine the number of clusters and the cluster membership. Example embodiments use a track clustering approach that uses the Fréchet distance metric, which satisfies the triangle inequality, for open or closed polygonal curves.

Figure 2:
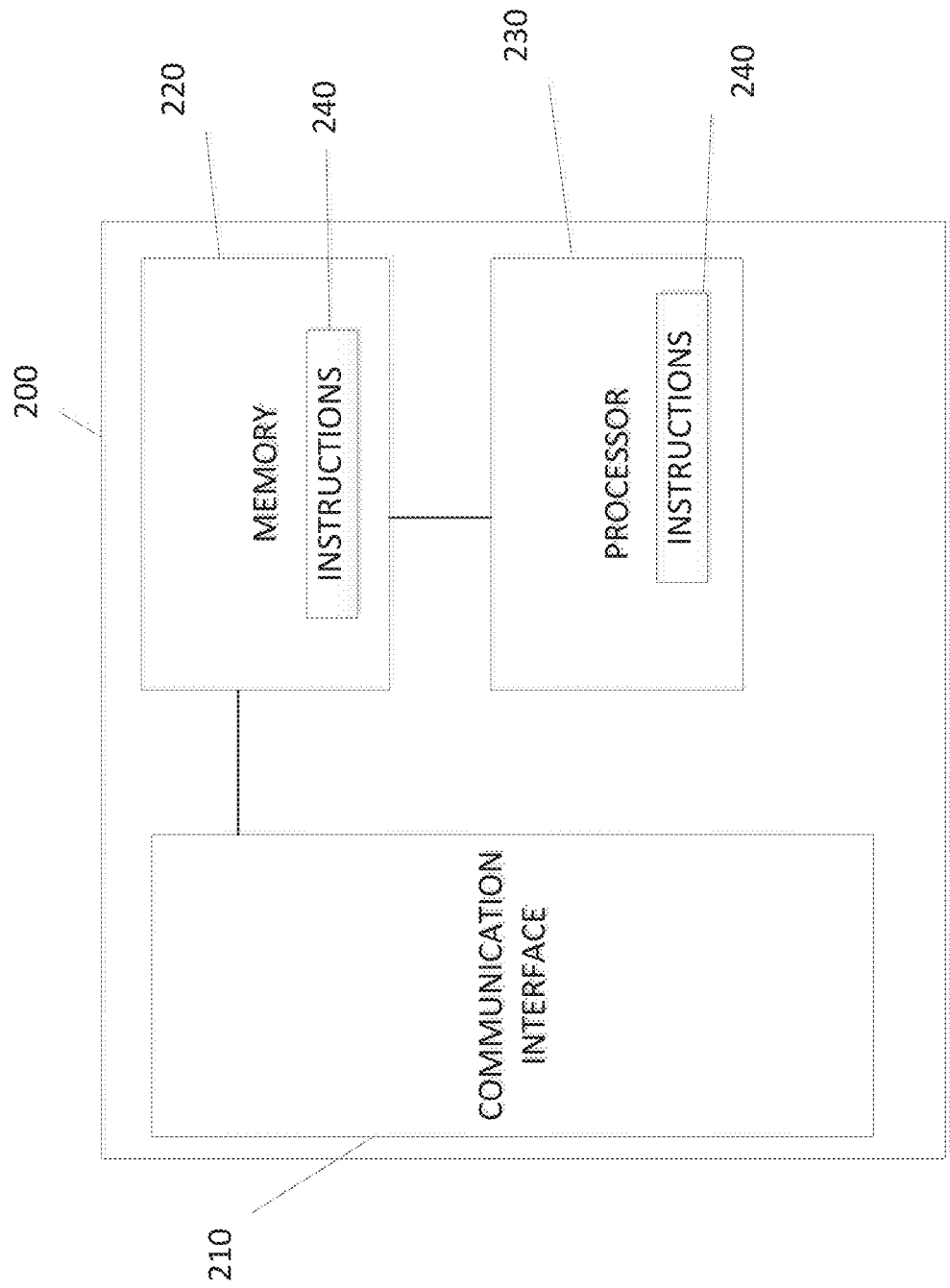
FIG. 2 is a block diagram of a system for implementing procedures in accordance with some embodiments.

FIG. 2 is a block diagram of a computer 200 for implementing methods according to example embodiments. The computer 200 may be appropriate for performing the functionalities of the computer 130 (FIG. 1). The computer 200 may be appropriate for providing, for example, data mining applications.

The computer 200 may include a communication interface 210. The communication interface 210 may be arranged to receive, for example, data from user devices 110-1 through 110-n (FIG. 1). The data received from user devices 110-1 through 110-n may be, for example, track data received from sensors, mobility data received from GPS-enabled user devices 110-1 through 110-n, etc. The data may comprise data entities, and the data entities may be stored in a memory 220. In one embodiment, memory 220 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

The processor 230 may be arranged to define a metric space over the data entities. A distance function of the data entities may satisfy an axiom of metric spaces, for example the triangle inequality. The data entities may be polygonal tracks. The polygonal tracks may each begin at a geographical start point and end at a geographical terminal point. The distance function may be a Fréchet distance.

The processor 230 may determine, based on the distance function of the metric space, a value for a number of clusters that minimizes a number of bits required to define a model of the collection. The model may then describe the collection of data entities using a minimum description length (MDL).

The processor 230 may assign data entities to the number of clusters, where the number of clusters corresponds to the determined value that minimizes the number of bits used to define the model. The processor 230 may determine a median data entity for each of the clusters. The processor 230 may determine the value for the number of clusters that minimizes the number of data bits used to define the model of the collection based on the median data entity for each of the clusters.

The processor 230 may perform at least the above operations based on algorithms such as those described below with respect to Equations (1)-(14) and Table 1.

MDL Estimation of Base Trajectories in a Data Set

Let the $n^{th}$ polygonal trajectory $P_n$ in a dataset (n=1, ..., N) be composed of a set of ordered points in the plane $p_i=(x_i,y_i)$ (for i=1, ..., $I_n$). Let the distance between two polygonal curves P and Q be given by the Fréchet distance $$\delta_F(P, Q) = \min_{\substack{\alpha: \ [0\ 1] \to P \\ \beta: \ [0\ 1] \to Q}} \max_{t \in [0\ 1]} \|P(\alpha(t)) - Q(\beta(t))\| \tag{1}$$

The processor 230 may compute the Fréchet distance between two polygonal curves in O(pqlog(pq)) time where p=|P| and q=|Q| are the number of points in P and Q respectively.

To obtain a maximum likelihood formulation of the problem, suppose that the data set $P^N=\{P_n|n=1, \ldots, N\}$ can be characterized with a Gaussian probability distribution function (pdf) as $$f(P^N) = \prod_{n=1}^{N} \frac{1}{\sqrt{2\pi\sigma^2}} \exp\left(-\frac{\delta_F^2(P_n, P)}{2\sigma^2}\right) \tag{2}$$

Then the maximum likelihood estimate of the "mean" trajectory is given by the value of P that minimizes the log likelihood $$\Lambda(P) = \Sigma_{n=1}^{N} \delta_F^2(P_n, P). \tag{3}$$

The "mean" in (3) has been conventionally applied for general shapes. It will be noted that P consists of a set of unknown ordered points with an unknown cardinality, and the optimization of (3) may be obtained using a meta-heuristic optimization method. Conventional methods present a (1+ε) approximation algorithm for calculation of the mean that runs in near linear time, but the collection of polygonal curves according to conventional methods must be c-packed. Further, conventional methods may utilize an alternative Fréchet distance metric, sometimes referred to as a "weak" Fréchet distance metric that does not satisfy the triangle inequality. Because the Fréchet distance in example embodiments satisfies the triangle inequality, the processor 230 can obtain a simple heuristic for (3) with a bound as $$\Lambda(P) \le \min_{P_m}\left(\sum_{n=1}^{N} \delta_F^2(P_n, P_m)\right) \le \sum_{n=1}^{N} \min_{P_m}(\delta_F(P_n, P) + \delta_F(P, P_m))^2 \le \tag{4}$$

$$\sum_{n=1}^{N} (\delta_F(P_n, P) + \delta_F(P, P_2))^2 \le 4\Lambda(P)$$

It will be noted that in order to calculate the simple heuristic in (4) the processor 230 will calculate $O(N^2)$ Fréchet distances. The processor 230 can determine the minimum in O(N) time as the processor 230 computes the matrix of distances, $\delta_F(P_n, P_m)$. This heuristic finds a median that can provide a convenient starting place for a meta-heuristic method that would be used to find the mean. Some conventional methods consider tabu merge, split, and move for the simplification of polygonal curves when an approximation error is specified. Similar methods can be used to minimize (3) with the simple heuristic in (4) used to start the processing. Following the usual method, the processor estimates the maximum likelihood σ as $$\sigma_{ML} = \sqrt{\frac{1}{N}\sum_{n=1}^{N} \delta_F^2(P_n, P)}, \tag{5}$$

where P minimizes the log likelihood in (3).

Suppose that the actual data set consists of a mixture of K base trajectories. The density in (2) could then be characterized as $$f(P^N) = \prod_{k=1}^{K}\prod_{n\in N_k} \frac{1}{\sqrt{2\pi\sigma_k^2}} \exp\left(-\frac{\delta_F^2(P_n, Q_k)}{2\sigma_k^2}\right) \tag{6}$$

where $N_k$ represents the set of track indices assigned to base trajectory $Q_k$, $\cup_{k=1}^{K} N_k = \{1 \ldots N\}$, and $N_{k_1} \cap N_{k_2} = \Phi$ for all $k_1 \ne k_2$.

In this case, the processor 230 estimates partitions and variances. Taking the negative log of (6) leads to the likelihood function $$\Lambda(K, \{N_k\}_{k=1}^{K}, \{\sigma_k^2\}_{k=1}^{K}, \{Q_k\}_{k=1}^{K}) = \tag{7}$$

$$\sum_{k=1}^{K}\left(\frac{|N_k|}{2}\ln(\sigma_k^2) + \frac{1}{2\sigma_k^2}\sum_{n\in N_k} \delta_F^2(P_n, Q_k)\right)$$

where $|N_k|$ is the number of indices in $N_k$.

It should be noted that taking the partial derivative of (7) with respect to $\sigma_k^2$ and solving for the variance yields $$\sigma_k^2 = \frac{1}{|N_k|}\sum_{n\in N_k} \delta_F^2(P_n, Q_k). \tag{8}$$

Substituting (8) into (7) yields the likelihood function $$\Lambda(K, \{N_k\}_{k=1}^K, \{Q_k\}_{k=1}^K) = \sum_{k=1}^K \left(|N_k|\ln\left(\frac{1}{|N_k|}\sum_{n\in N_k}\delta_F^2(P_n, Q_k)\right)\right) \quad (9)$$

Given K and the set of partitions, the set of base trajectories will minimize the likelihood equation in (9). Consider any partition. As is known, the arithmetic mean is greater than the geometric mean, and the likelihood in (9) may be made smaller by breaking each partition into $|N_k|$ single-track partitions. If the number of base trajectories is incorporated as part of the maximum likelihood estimate, there will be obtained as many base trajectories as there are trajectories in the data base (i.e. K=N), which is an undesirable result. Note that there are K mean trajectories, K variances, and that the processor 230 may select K partitions to describe a model of order K. Let $l_k$ be the number of points in the $k^{th}$ mean and note that the processor may use an N-tuple consisting of selections from $\{1, \ldots, K\}$ to describe the partitions. It follows that the two-part MDL estimate of the base trajectories is given as (10)

$$(K, \{N_k\}_{k=1}^K, \{Q_k\}_{k=1}^K)_{MDL} = \min_{K, \{N_k\}_{k=1}^K, \{Q_k\}_{k=1}^K}\{\Lambda(K, \{N_k\}_{k=1}^K, \{Q_k\}_{k=1}^K) + \frac{1}{2}(N+K+d\Sigma_{k=1}^K l_k)\ln(N)\} = \min_K\{\Lambda^0(K) + \frac{1}{2}(K+N)\ln(N)\} \quad (10)$$

where d=2 for points in the plane and the first term on the right includes the optimized likelihood function in (9):

$$\Lambda^0(K) = \min_{\{N_k\}_{k=1}^K, \{Q_k\}_{k=1}^K}\left(\Lambda(K, \{N_k\}_{k=1}^K, \{Q_k\}_{k=1}^K) + \frac{d}{2}\ln(N)\sum_{k=1}^K \ell_k\right). \quad (11)$$

As K increases the likelihood term in (11) decreases, but the remaining terms in (10) and (11) increase to penalize an over parameterization of the data model. Further, the term N/2 ln(N) in (10) is common for all K and the processor 230 may drop this term from the minimization.

K-Medians MDL

In (11) each of the K partitions requires the calculation of its corresponding mean, which may be a time-consuming process. In example embodiments, therefore, the processor 230 employs a heuristic to find the corresponding medians (i.e. the member of each partition that minimizes (11)). Clustering heuristics have been conventionally used on any collection of objects defined on a metric space. In particular, consider the problem of finding the "best" partition of $P^N$ into K clusters $\{N_k\}_{k=1}^K$ in such a way that the maximum diameter of any cluster is minimized, where the diameter of the $k^{th}$ cluster is given as $$Dia(N_k) = \max_{(n,m)\in N_k}\delta_F(P_n, P_m). \quad (12)$$

The problem illustrated in (12) is NP-hard. However, with the "farthest point clustering" (FPC) heuristic, in example embodiments, the processor 230 computes a partition with maximum cluster size no more than twice the optimal. The FPC heuristic according to example embodiments locates the cluster medians and the cluster partitions using the matrix of Fréchet distances, and can be formulated to calculate a K-medians version of (10), as shown in the pseudo code of Table 1, discussed further below.

If the clusters are computed to minimize the maximum diameter it follows from (11) that $$\Lambda(K, \{N_k\}_{k=1}^K, \{Q_k\}_{k=1}^K) < \quad (13)$$

$$2\sum_{k=1}^K (|N_k|\ln(Dia(N_k))) < 2N\ln\left(\max_{k\in[1,\ldots,K]}(Dia(N_k))\right),$$

It further follows that minimizing the maximum partition diameter produces a tighter upper bound in (13).

The processor 230 may describe the model using a two-part MDL. A first part of the two-part MDL may describe errors between the model and the data entities. A second part of the two-part MDL may describe the model of the data entities. The processor 230 may determine a diameter for the clusters. The first part of the two-part MDL may be limited to a value based on the maximum of the diameters of the clusters. The processor 230 may determine the value for the number of clusters such that the maximum diameter of the clusters is minimized. The processor 230 may determine the value for the number of clusters according to a farthest point clustering (FPC) heuristic.

In an example embodiment, the processor 230 may implement instructions, which may be similar to the illustrative example pseudo code listed below in Table 1, to find the number of clusters of data points that allows the processor 230 to describe a model of a collection of data points using a minimum number of bits. While the pseudo code below describes example embodiments implemented in two dimensions (d=2), the operations performed by the processor 230 may further be extended for three or more dimensions.

TABLE 1

Pseudo Code for K-medians MDL (d = 2).

```
 1:  onesum=Inf; onemedian=NaN; maxd=0;
 2:  for n=1:N
 3:      rowsum=0;
 4:      for m=1:N
 5:          compute and save d=δ_F(P_n, P_m)
 6:          if d>maxd    //first 2 medians in farthest point
 7:              maxd = d; kmedians={n,m};
 8:          end
 9:          rowsum=rowsum+d²
10:      end
11:      test = N*log(rowsum/N) + length(P_n)*log(N)
12:      if test<onesum    //median for one cluster
13:          onesum=rowsum; onemedian=n;
14:      end
15:  end
16:  bestK=1; bestpart={1,...,N}; bestmedians={onemedian};
17:  [bestMDL,bestmedians ]=MDL(bestK,bestpart)
18:  for all n=1:N not in kmedians
19:      assign P_n in part
20:  end
21:  thisK=2; thispart=part;
22:  [thisMDL, thismedians]=MDL(thisK,thispart)
23:  while thisMDL<bestMDL
24:      bestMDL=thisMDL; bestK=thisK; bestpart=thispart;
25:      bestmedians=thismedians;
26:      thisK=bestK+1;
27:      maxd=0; nextmedian=NaN;
28:      for all n=1:N not in kmedians
29:          mind=Inf
30:          for all m in kmedians
31:              get d=δ_F(P_n, P_m)
32:              if d<mind, mind=d; end
33:          end
34:          if mind>maxd
35:              maxd=mind; nextmedian=n;
36:          end
```

TABLE 1-continued

Pseudo Code for K-medians MDL (d = 2).

```
37:        end
38:        kmedians={kmedians, nextmedian}
39:        for all n=1:N not in kmedians
40:               assign $P_n$ in part
41:        end
42:        thispart=part;
43:        [thisMDL, thismedians]=MDL(thisK,thispart)
44:    end
45:    return bestK, bestpart, bestmedians, bestMDL
```

In the illustrative example pseudo code, in lines 2-15, the processor 230 may compute a matrix of Fréchet distances as described previously Further, in lines 2-15, the processor 230 may determine a median for the case of one cluster and the medians for FPC for the case of two clusters. The processor 230 may use these medians and clusters for further computations described below with respect to lines 23-44. In lines 18-21, the processor 230 may partition data entities into two clusters. For example, the processor 230 may assign data entities to a cluster of the two clusters to which the data entity is closest.

The processor 230 performs the calculation of the median for each partition within the MDL function at lines 17, 22, and 43 and uses equations (9) and (11) to locate the best polygonal track within each partition. The processor 230 uses the kmedians array for partitioning the data set.

In lines 23-44, the processor 230 may determine a number of clusters that minimizes the number of bits (MDL) used to describe a model of the collection of data entities. The processor 230 may use the above-computed clusters and medians as initial clusters and medians. If the MDL is not minimized, the processor 230 may increment the number of clusters and re-compute the MDL until the MDL is minimized. In lines 28-37, the processor 230 may determine a median data entity within each cluster using a FPC heuristic as described above with respect to Equations (9)-(13). In some embodiments, the number of clusters may be further incremented after a minimum MDL is located, in order to determine whether a minimum MDL is a local minimum. Upon incrementing the number of clusters, the processor 230 may assign data entities to the clusters in lines 39-41. Accordingly, upon finding the number of clusters that minimizes MDL, the processor 230 will have assigned the data entities to their appropriate clusters.

K-Medians Refinement

In example embodiments, the processor 230 may refine the medians as described above by removing a vertex of a polygonal track. The processor 230 may refine the median by using a Douglas-Peucker heuristic.

Note that the second term in equation (11) depends on the number of edges in the mean. When approximated with the median, the processor 230 may reduce this term by removing interior vertices that satisfy a distance constraint. This may be referred to as the polygonal chain approximation problem. One algorithm to solve this problem is the Douglas-Peucker (D-P) heuristic. According to the D-P median refinement the processor 230 may select a tolerance, for example a tolerance of three times the RMS measurement error ($\sigma_m$) in every case. The processor 230 may compute the Fréchet distance to the refined median for every track in the partition to obtain the first term in equation (11).

K-Medians CS Measure

In some example embodiments, the processor 230 may find the optimum number of clusters using a CS measure. The CS measure is given as $$CS(K) = \frac{\sum_{k=1}^{K} \frac{1}{|N_k|} \sum_{n \in N_k} \max_{m \in N_k} (\delta_F(P_n, P_m))}{\sum_{k=1}^{K} \min_{\substack{l \in \{1, \ldots, K\} \\ l \neq k}} \delta_F(Q_k, Q_l)} \quad (14)$$

where $Q_k$ is the mean of the $k^{th}$ cluster.

The value of K that minimizes CS(K) determines the optimum number of clusters. It will be noted that the denominator of (14) is undefined when K=1, an important case to consider when clustering track data. In example embodiments, in (14) the means in the denominator is replaced with the medians obtained from the FPC, heuristic, and the algorithm in Table 1 is adapted to use this modification of equation (14). With this approach, the partitions used in both the K-medians version and the CS measure version will be identical, and the determination of the number of partitions will depend on the method used.

Embodiments may also be implemented as instructions 240 stored on a computer-readable storage device, which may be read and executed by at least one processor 230 to perform the operations described herein. In some embodiments, the instructions 240 are stored on the processor 230 or the memory 220 such that the processor 230 and the memory 220 act as computer-readable mediums. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

Figure 3:
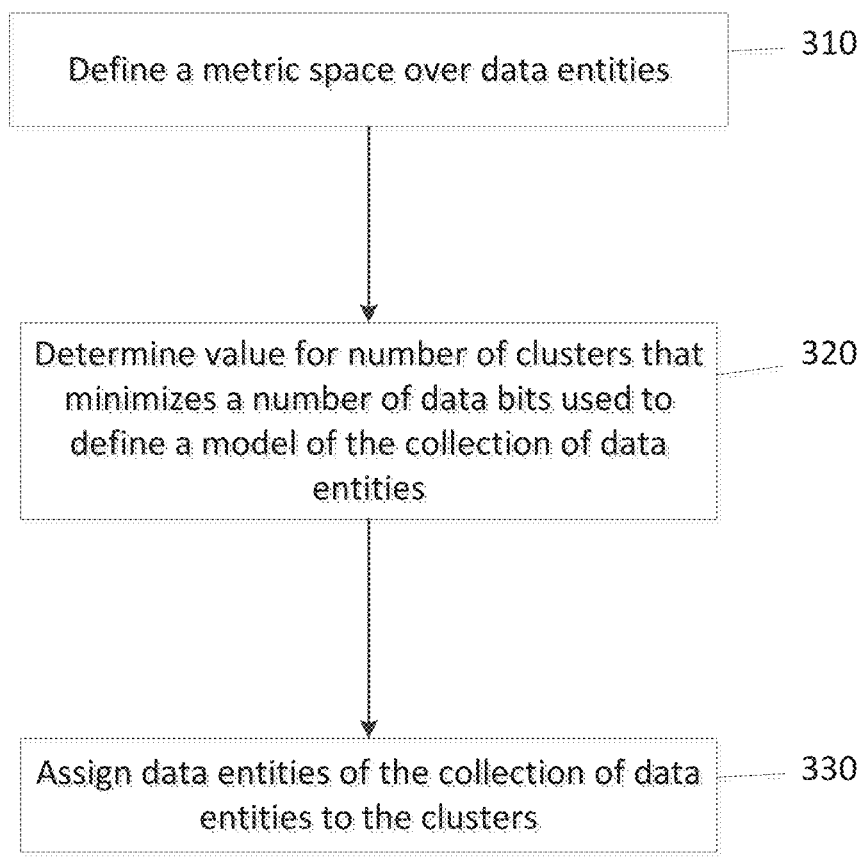
FIG. 3 is a procedure for identifying clusters within a collection of data entities in accordance with some embodiments.

FIG. 3 is a flow chart of a method for identifying clusters within a collection of data entities. The method may be performed by, for example, the processor 230 as described above.

In operation 310, the processor 230 may define a metric space over the data entities. A distance function of the metric space may satisfy a triangle inequality. The distance function may be a Fréchet distance.

In operation 320, the processor 230 may determine a value for the number of clusters that minimizes a number of data bits used to define a model of the collection of data entities. The determining may be based on the distance function of the metric space. The model may thereby describe the collection of data entities using a minimum description length (MDL). The processor 230 may determine a diameter for the clusters. The processor 230 may determine the value for the number of clusters such that the diameter of the clusters is minimized. The processor 230 may determine the value for the number of clusters according to a farthest point clustering (FPC) heuristic. The processor may determine a median data entity for each of the clusters. The value for the number of clusters may be determined based on the median data entity for each of the clusters.

In operation 330, the processor 230 may assign data entities of the collection of data entities to the clusters. The number of clusters may correspond to the value determined in operation 320.

The model may be described using a two-part MDL. A first part of the two-part MDL may describe errors between the model and the data entities. The second part of the two-part MDL may describe the model. The first part of the two-part MDL may be limited to a value based on a maximum of the diameters of the clusters.

The collection of data entities may comprise polygonal tracks. A polygonal track may begin at a geographical start point and a polygonal track may end at a geographical terminal point. The median data entity may be refined by removing a vertex of a polygonal track. The median data entity may be refined using a Douglas-Peucker heuristic.

Figure 4:
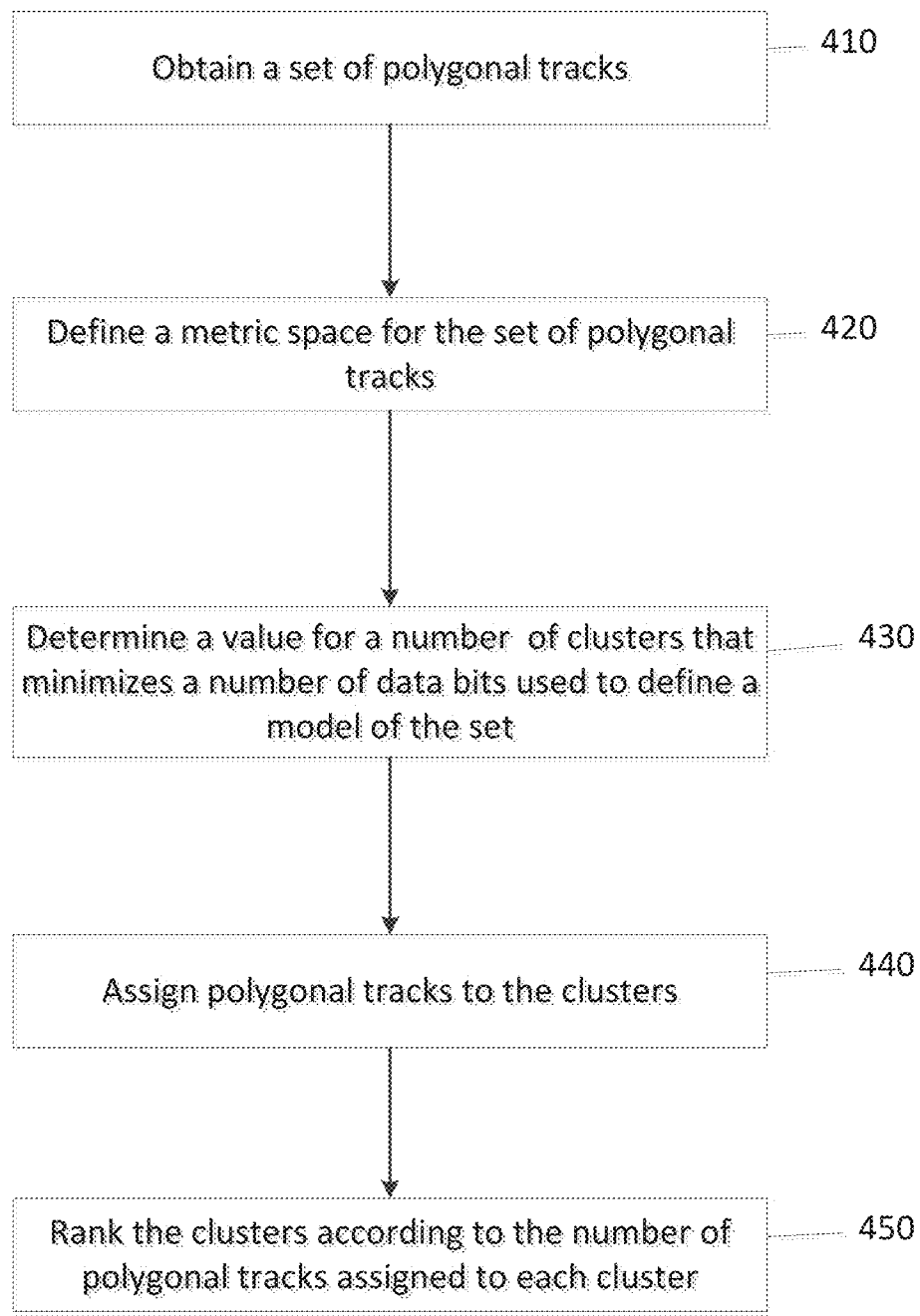
FIG. 4 is a procedure for generating one or more recommended routes, in accordance with some embodiments.

FIG. 4 is a flow chart of a method for generating one or more recommended routes. The method may be performed by, for example, the processor 230 as described above.

In operation 410, the processor 230 may obtain a set of polygonal tracks. A polygonal track of the set of polygonal tracks may begin at a geographical start point and end at a geographical terminal point. The set of polygonal tracks may be obtained from user devices. The user devices may include global positioning system capabilities.

In operation 420, the processor 230 may define a metric space for the set of polygonal tracks. A distance function of the metric space may satisfy the triangle inequality.

In operation 430, the processor 230 may determine a value for the number of clusters that minimizes a number of data bits used to define a model of the set. The determining may be based on the distance function of the metric space. The model may thereby describe the set using a minimum description length (MDL).

In operation 440, the processor 230 may assign polygonal tracks to the clusters. The number of clusters may correspond to the value determined in operation 320.

In operation 450, the processor 230 may rank the clusters according to the number of polygonal tracks assigned to each cluster. A cluster with the largest number of polygonal tracks may represent a most popular user route.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for identifying clusters within a collection of data entities, the method comprising:
   defining a metric space over the data entities, a distance function of the metric space satisfying a triangle inequality;
   determining, based on the distance function of the metric space, a value for a number of clusters that minimizes a number of data bits used to define a model of the collection of data entities, such that the model describes the collection of data entities using a minimum description length (MDL), wherein the MDL corresponds to a length of a description of the model of the collection of data entities;
   assigning data entities of the collection of data entities to clusters of the number of clusters, the number of clusters corresponding to the value that minimizes the number of data bits used to define the model of the collection of data entities;
   generating a count for the number of data entities in the clusters; and
   ranking the clusters according to the number of data entities assigned to each cluster, such that a cluster with the largest number of data entities represents a geographically-referenced most popular cluster, wherein
   the determining further comprises determining a median data entity for each of the clusters, and
   the determining of the value for the number of clusters that minimizes the number of data bits used to define the model of the collection is further based on the median data entity for each of the clusters, and further wherein
   the collection of data entities comprises polygonal tracks, a polygonal track beginning at a geographical start point and the polygonal track ending at a geographical terminal point, and
   the determining of the median data entity is refined by removing a vertex of a polygonal track.

2. The method of claim 1, wherein the model is described using a two-part MDL, a first part of the two-part MDL describing errors between the model and the data entities, and a second part of the two-part MDL describing the model.

3. The method of claim 2, wherein the determining further comprises determining a diameter for the clusters, and
   the first part of the two-part MDL is limited to a value based on a maximum of the diameters of the clusters.

4. The method of claim 3, wherein the determining determines the value for the number of clusters such that the maximum diameter of the clusters is minimized.

5. The method of claim 4, wherein the determining determines the value for the number of clusters according to a farthest point clustering heuristic.

6. The method of claim 1, wherein the median data entity is refined using a Douglas-Peucker heuristic.

7. The method of claim 1, wherein the data entities are polygonal tracks, wherein a polygonal track begins at a geographical start point and ends at a geographical terminal point, and the distance function is a Fréchet distance.

8. A method for generating one or more recommended routes, the method comprising:
   obtaining a set of polygonal tracks, a polygonal track of the set of polygonal tracks beginning at a geographical start point and ending at a geographical terminal point;
   defining a metric space for the set of polygonal tracks, a distance function of the metric space satisfying a triangle inequality;
   determining, based on the distance function of the metric space, a value for a number of clusters that minimizes a number of data bits used to define a model of the set, such that the model describes the set using a minimum description length (MDL), wherein the MDL corresponds to a length of a description of the model of the set of polygonal tracks;
   assigning polygonal tracks of the set of polygonal tracks to clusters of the number of clusters, the number of clusters corresponding to the value that minimizes the number of data bits used to define the model of the set of polygonal tracks;
   generating a count of the polygonal tracks of the set of polygonal tracks that has been assigned to each cluster; and
   ranking the clusters according to the count for the number of polygonal tracks assigned to each cluster, such that a cluster with the largest number of polygonal tracks represents a most popular user route.

9. The method of claim 8, wherein the set of polygonal tracks is obtained from user devices, the user devices including global positioning system (GPS) capabilities.

10. A system for identifying clusters in collections of data entities, the system comprising:
a memory to store data entities; and
a processor configured to,
define a metric space over the data entities, a distance function of the metric space satisfying a triangle inequality;
determine, based on the distance function of the metric space, a value for a number of clusters that minimizes a number of bits required to define a model of the collection, such that the model describes the collection of data entities using a minimum description length (MDL), wherein the MDL corresponds to a length of a description of the model of the collection of data entities;
assign data entities to clusters of the number of clusters, the number of clusters corresponding to the value that minimizes the number of data bits used to define the model of the collection of data entities;
generate a count for the number of data entities in the clusters; and
rank the clusters according to the number of data entities assigned to each cluster, such that a cluster with the largest number of data entities represents a geographically-referenced most popular cluster, wherein the determining further comprises determining a median data entity for each of the clusters, and the determining of the value for the number of clusters that minimizes the number of data bits used to defined the model of the collection is further based on the median data entity for each of the clusters, and further wherein the collection of data entities comprises polygonal tracks, the polygonal tracks beginning at a geographical start point and the polygonal tracks ending at a geographical terminal point, and the processor refines the median data entity by removing a vertex of a polygonal track.

11. The system of claim 10, wherein the processor is further configured to:
describe the model using a two-part MDL, a first part of the two-part MDL describing errors between the model and the data entities, and a second part of the two-part MDL describing the model.

12. The system of claim 11, wherein the processor is further configured to:
determine a diameter for the clusters, and wherein
the first part of the two-part MDL is limited to a value based on a maximum of the diameters of the clusters.

13. The system of claim 12, wherein the processor determines the value for the number of clusters such that the maximum diameter of the clusters is minimized.

14. The system of claim 13, wherein the processor determines the value for the number of clusters according to a farthest point clustering heuristic.

15. The system of claim 10, wherein the processor refines the median data entity using a Douglas-Peucker heuristic.

16. The system of claim 10, wherein
the data entities are polygonal tracks, wherein a polygonal track begins at a geographical start point and ends at a geographical terminal point, and
the distance function is a Fréchet distance.

* * * * *

UNITED STATES PATENT AND TRADEMARK OFFICE
CERTIFICATE OF CORRECTION

PATENT NO. : 9,256,681 B2  
APPLICATION NO. : 13/686995  
DATED : February 9, 2016  
INVENTOR(S) : Kenefic et al.

Page 1 of 1

It is certified that error appears in the above-identified patent and that said Letters Patent is hereby corrected as shown below:

Claims

In column 11, line 24, in Claim 10, after "wherein", insert --¶--, therefor

In column 11, line 26, in Claim 10, after "and", insert --¶--, therefor

In column 12, line 4, in Claim 10, after "and", insert --¶--, therefor

Signed and Sealed this  
Twenty-sixth Day of July, 2016

Michelle K. Lee  
*Director of the United States Patent and Trademark Office*